(12) United States Patent
Van Phan et al.

(10) Patent No.: US 9,179,444 B2
(45) Date of Patent: Nov. 3, 2015

(54) COOPERATIVE RELAY SYSTEM

(75) Inventors: Vinh Van Phan, Oulu (FI); Ling Yu, Oulu (FI); Kari Veikko Horneman, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 13/819,459

(22) PCT Filed: Sep. 3, 2010

(86) PCT No.: PCT/EP2010/062942
§ 371 (c)(1),
(2), (4) Date: Feb. 27, 2013

(87) PCT Pub. No.: WO2012/028199
PCT Pub. Date: Mar. 8, 2012

(65) Prior Publication Data
US 2013/0172000 A1  Jul. 4, 2013

(51) Int. Cl.
*H04W 36/00* (2009.01)
*H04W 24/00* (2009.01)
*H04W 4/00* (2009.01)
*H04W 72/04* (2009.01)
*H04W 16/26* (2009.01)
*H04W 84/04* (2009.01)

(52) U.S. Cl.
CPC .............. *H04W 72/04* (2013.01); *H04W 16/26* (2013.01); *H04W 72/0406* (2013.01); *H04W 84/047* (2013.01)

(58) Field of Classification Search
USPC .......... 455/424, 425, 436, 437, 558; 370/255, 370/338; 713/168
See application file for complete search history.

(56) References Cited

U.S. PATENT DOCUMENTS

| | | | |
|---|---|---|---|
| 2007/0186106 A1* | 8/2007 | Ting et al. | 713/168 |
| 2007/0249347 A1 | 10/2007 | Saifullah et al. | |
| 2008/0045220 A1* | 2/2008 | Ishii et al. | 455/438 |
| 2009/0156213 A1* | 6/2009 | Spinelli et al. | 455/436 |
| 2009/0213825 A1* | 8/2009 | Gupta et al. | 370/338 |
| 2009/0285124 A1* | 11/2009 | Aguirre et al. | 370/255 |
| 2010/0238854 A1* | 9/2010 | Kazmi et al. | 370/315 |
| 2011/0021193 A1* | 1/2011 | Hong | 455/435.1 |
| 2012/0052911 A1* | 3/2012 | Chin et al. | 455/558 |
| 2012/0114021 A1* | 5/2012 | Chung et al. | 375/211 |
| 2012/0218886 A1 | 8/2012 | Van Phan et al. | 370/229 |
| 2012/0231797 A1 | 9/2012 | Van Phan et al. | 455/437 |

FOREIGN PATENT DOCUMENTS

| | | |
|---|---|---|
| CN | 101175304 A | 5/2008 |
| CN | 101449613 A | 6/2009 |

(Continued)

OTHER PUBLICATIONS

R3-102370, Solution for RN configuration, 3GPP TSG-RAN WG3 Meeting #69, Madrid, Spain, Aug. 23-27, 2010, vol. RAN WG3, no. Madrid, Spain; 20100823, Aug. 15, 2010, XP050453221.

(Continued)

*Primary Examiner* — Omoniyi Obayanju
(74) *Attorney, Agent, or Firm* — Harrington & Smith

(57) ABSTRACT

The invention relates to apparatuses, methods, systems, computer programs, computer program products and computer-readable media.

5 Claims, 3 Drawing Sheets

(56) References Cited

FOREIGN PATENT DOCUMENTS

Figure 1A:
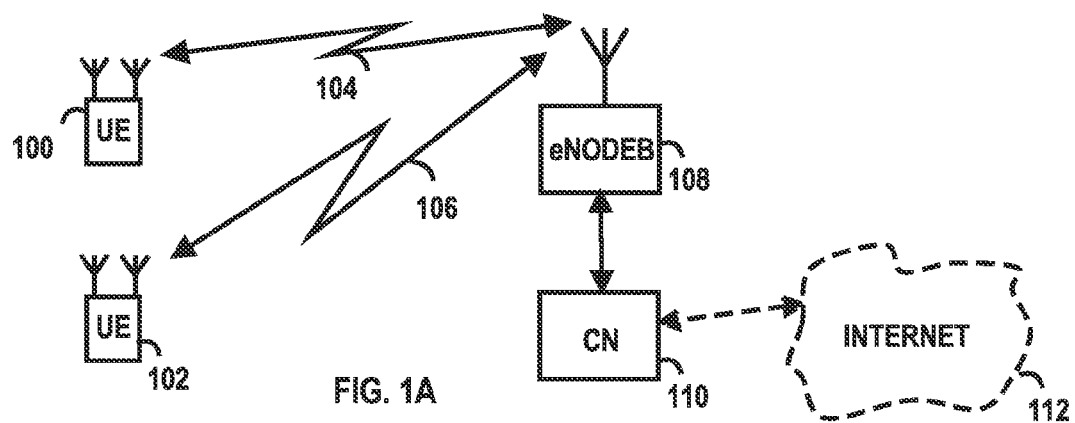

WO  WO-2008/084394 A2  7/2008
WO  WO-2011/110229 A1  9/2011

OTHER PUBLICATIONS

2011Q01199 3GPP TR 36.806 V9.0.0 (Mar. 2010), 3GPP, Technical Specification Group Radio Access Networks; Evolved Universal Terrestrial Radio Access (E-UTRA); Relay architectures for E-UTRA (LTE-Advanced) (Release 9).

3GPP TS 36.423 V930 (Jun. 2010), Technical Specification Group Radio Acces Network; Evolved Universal Terrestrial Radio Access Network (E-UTRAN); X2 application protocol (X2AP) (Release 9).
Dynamic Relaying in 3GPP LTE Advanced Networks, Oumer Teyeb et al, Eurasiü Journal on Wireless Communications and Networking; Hindawi Publishing Corporation, New, NY, US, vol. 2009, No. Art. ID 731317, Jan. 1, 2009, pp. 1-11, XP002572643, ISSN: 1687-1472, DOI: DOI: 10.1155/2009/731317.
3GPP TR 36.814 V900 (Mar. 2010), Technical Specification Group Radio AccessNetwork; Evolved Universal Terrestrial Radio Access (E-UTRA); Further advancements for E-UTRA physical layer aspects (Release 9).

\* cited by examiner

COOPERATIVE RELAY SYSTEM

FIELD

The invention relates to apparatuses, methods, systems, computer programs, computer program products and computer-readable media.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context. Smart coordinated and cooperative relay systems possibly with one or more multiple simultaneous donor cellular systems of one or plurality operators are designed to provide flexible deployment of a number of relay nodes for enhanced cellular coverage in large indoor buildings, hot spots at cell edges, passenger trains or cruise ships, for instance.

BRIEF DESCRIPTION

According to a first aspect of the present invention, there is provided an apparatus comprising: at least one processor and at least one memory including a computer program code, the at least one memory and the computer program code configured to, with the at least one processor, cause the apparatus at least to: receive a network identity of a virtual operational network, the virtual operational network being a multi-operator network having a plurality of donor node candidates receive a configuration profile, the configuration profile comprising parameters in relation to resource usage in the virtual operational network; select at least one donor node from the donor system candidates; and indicate the network identity and the configuration profile to the selected at least one donor system in connection to setting up a backhaul connection to the selected at least one donor system.

According a second aspect of the present invention, there is provided a method comprising: receiving a network identity of a virtual operational network, the virtual operational network being a multi-operator network having a plurality of donor node candidates; receiving a configuration profile, the configuration profile comprising parameters in relation to resource usage in the virtual operational network; selecting at least one donor node from the donor system candidates; and indicating the network identity and the configuration profile to the selected at least one donor system in connection to setting up a backhaul connection to the selected at least one donor system.

In further embodiments of a method according to the second aspect,
  the virtual operational network may be a multi-operator network comprising a group of cooperative relay nodes,
  the donor system may comprise at least a donor node,
  the network identity may be a unique public land mobile network identity (PLMN ID) or tracking area identity (TA ID) different from that of donor systems,
  the configuration profile may comprise at least one of the following parameters: spectrum allocation of at least a primary carrier, global cell identification, layer 1 cell identification, and cell-selection control parameters,
  the method may further comprise exchanging timing references and derive appropriate timing offsets to be used in communication and cooperation with one another,
  the method may further comprise monitoring and carrying out updating of available capacity and/or load status on an access link and/or backhaul link.

According to a third aspect of the present invention, there is provided an apparatus comprising: means for receiving a network identity of a virtual operational network, the virtual operational network having a plurality of donor node candidates; means for receiving a configuration profile, the configuration profile comprising parameters in relation to resource usage in the virtual operational network; means for selecting at least one donor node from the donor system candidates; and means for indicating the network identity and the configuration profile to the selected at least one donor system in connection to setting up a backhaul connection to the selected at least one donor system.

In further embodiments of an apparatus according to the first or the third aspect,
  the virtual operational network may be a multi-operator network comprising a group of cooperative relay nodes,
  the donor system may comprise at least a donor node,
  the apparatus may be a relay node belonging to a group of cooperative relay nodes,
  the network identity may be a unique public land mobile network identity (PLMN ID) or tracking area identity (TA ID) different from that of donor systems,
  the configuration profile may comprise at least one of the following parameters: spectrum allocation of at least a primary carrier, global cell identification, layer 1 cell identification, and cell-selection control parameters,
  the apparatus may be further configured to exchange timing references and derive appropriate timing offsets to be used in communication and cooperation with other apparatuses,
the apparatus may be further configured to monitor and keep other relay nodes of the group of cooperative relay nodes and/or donor systems updated of available capacity and/or load status on an access link and/or backhaul link.

According to a fourth aspect of the present invention, there is provided a computer program product embodied on a computer readable medium, the computer program being configured to control a processor to perform: receiving a network identity of a virtual operational network, the virtual operational network having a plurality of donor node candidates; receiving a configuration profile, the configuration profile comprising parameters in relation to resource usage in the virtual operational network; selecting at least one donor node from the donor system candidates; and indicating the network identity and the configuration profile to the selected at least one donor system in connection to setting up a backhaul connection to the selected at least one donor system.

According to a fifth aspect of the present invention, there is provided an apparatus comprising: at least one processor and at least one memory including a computer program code, the at least one memory and the computer program code configured to, with the at least one processor, cause the apparatus at least to: receive, in connection to setting up a backhaul connection, a network identity of a virtual operational network and a configuration profile from a relay node of the virtual operational network, the configuration profile comprising parameters in relation to resource usage in the virtual operational network, the virtual operational network comprising a plurality of relay nodes; and manage the backhaul connection during operation.

According to a sixth aspect of the present invention, there is provided a method comprising: receiving, in connection to setting up a backhaul connection, a network identity of a virtual operational network and a configuration profile from a relay node of the virtual operational network, the configuration profile comprising parameters in relation to resource usage in the virtual operational network, the virtual operational network comprising a plurality of relay nodes; and managing the backhaul connection during operation.

In further embodiments of a method according to the sixth aspect,
the virtual operational network may be a multi-operator network comprising a group of cooperative relay nodes,
the network identity may be a unique public land mobile network identity (PLMN ID) or tracking area identity (TA ID) different from that of donor systems,
the configuration profile may comprise at least one of the following parameters: spectrum allocation of at least a primary carrier, global cell identification, layer 1 cell identification, and cell-selection control parameters,
the method may further comprise communicating with other apparatuses on modifications to the configuration profile, and convey an update of the configuration profile to a relay node.

According to a seventh aspect of the present invention, there is provided an apparatus comprising: means for receiving, in connection to setting up a backhaul connection, a network identity of a virtual operational network and a configuration profile from a relay node of the virtual operational network, the configuration profile comprising parameters in relation to resource usage in the virtual operational network, the virtual operational network comprising a plurality of relay nodes; and means for managing the backhaul connection during operation.

In further embodiments of an apparatus according to the fifth or the seventh aspect,
the virtual operational network may be a multi-operator network comprising a group of cooperative relay nodes,
the network identity may be a unique public land mobile network identity (PLMN ID) or tracking area identity (TA ID) different from that of donor systems,
the configuration profile may comprise at least one of the following parameters:
spectrum allocation of at least a primary carrier, global cell identification, layer 1 cell identification, and cell-selection control parameters,
the apparatus may be further configured to communicate with other apparatuses on modifications to the configuration profile, and convey an update of the configuration profile to a relay node,
the apparatus may comprise a donor node,
the apparatus may be coupled to a mobile management entity gateway (MME/GW) to form a donor system,
the apparatus may be further configured to hand over the backhaul connection to another donor node or donor system for backhaul connection optimization purposes,
the apparatus may be further configured to initiate and perform a handover of the backhaul connection.

According to an eighth aspect of the present invention, there is provided a computer program product embodied on a computer readable medium, the computer program being configured to control a processor to perform: receiving, in connection to setting up a backhaul connection, a network identity of a virtual operational network and a configuration profile from a relay node of the virtual operational network, the configuration profile comprising parameters in relation to resource usage in the virtual operational network, the virtual operational network comprising a plurality of relay nodes; and managing the backhaul connection during operation.

LIST OF DRAWINGS

Figure 1B:
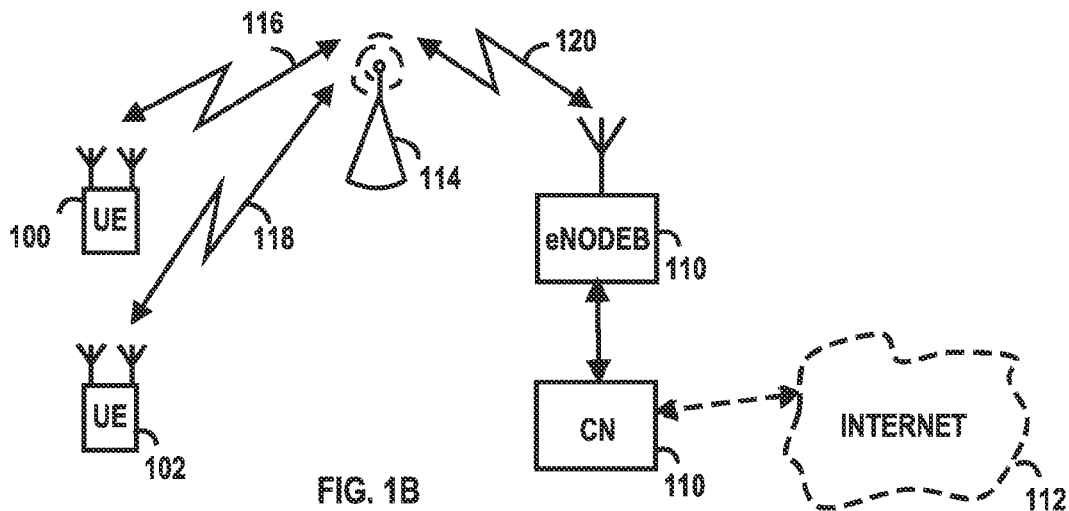
Figure 5:
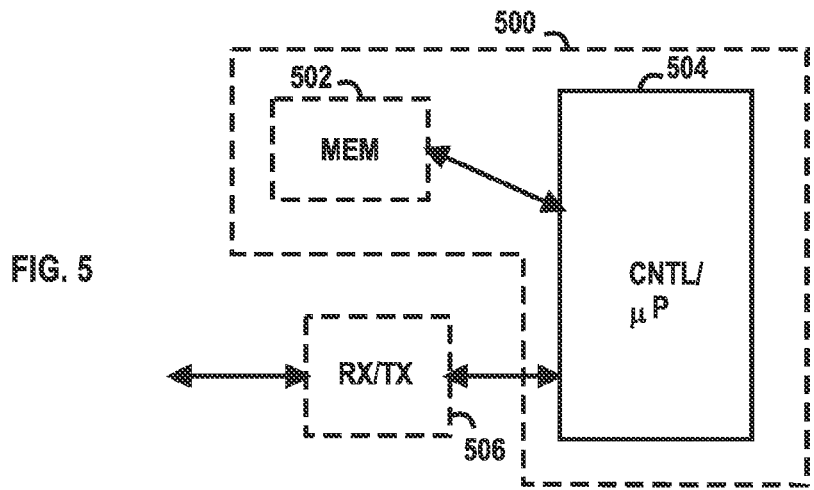
Figure 2:
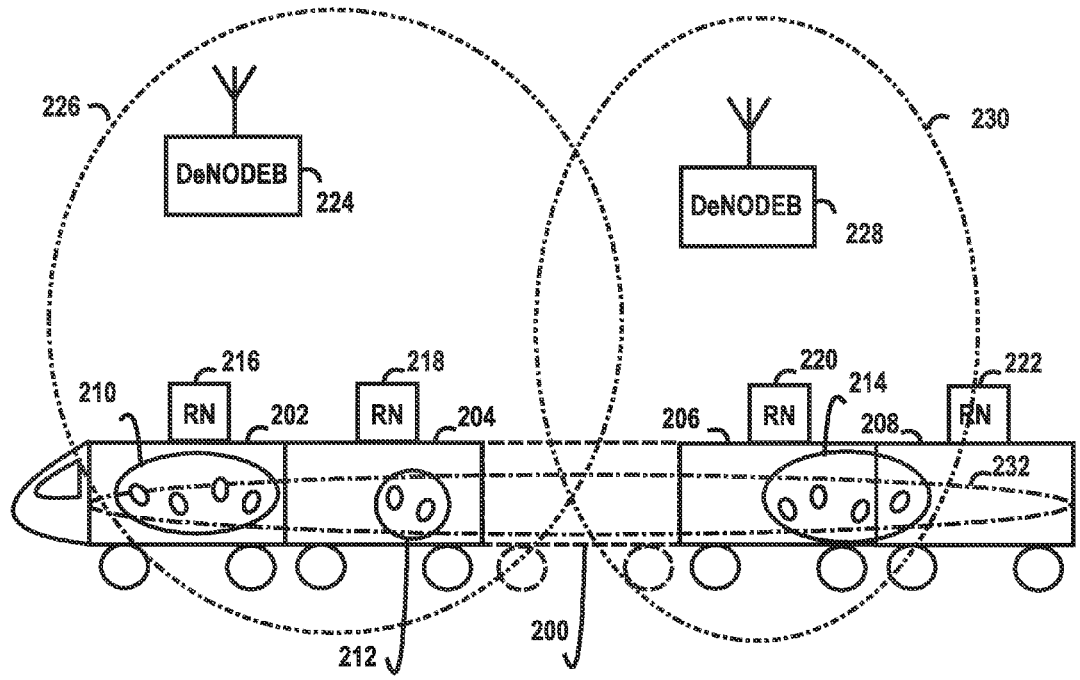
Figure 6:
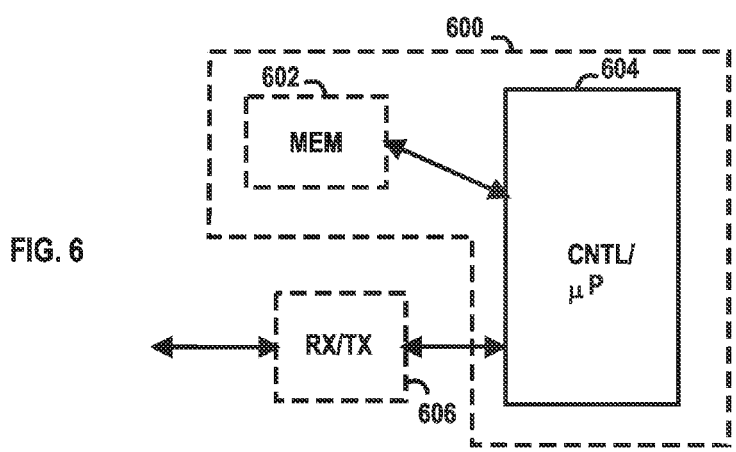
Figure 3:
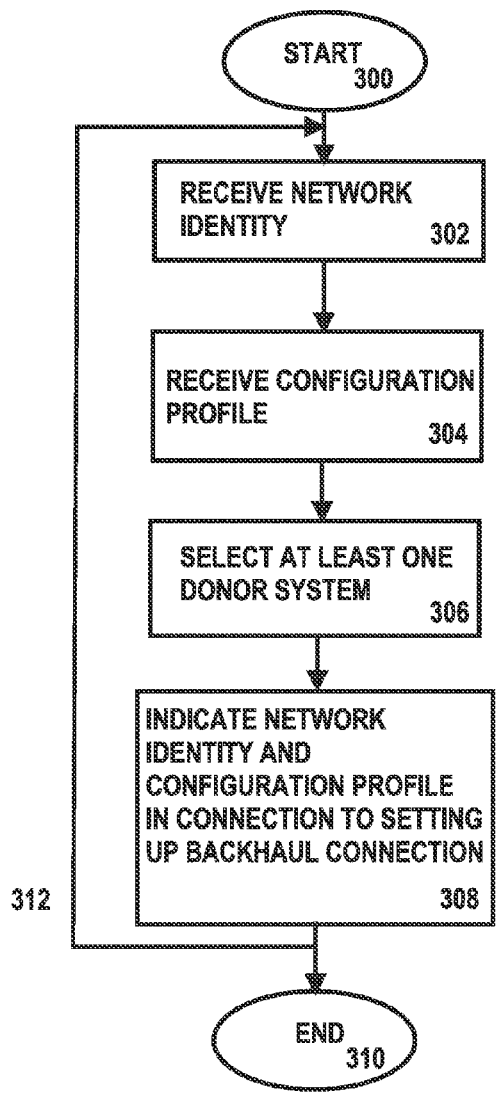
Figure 4:
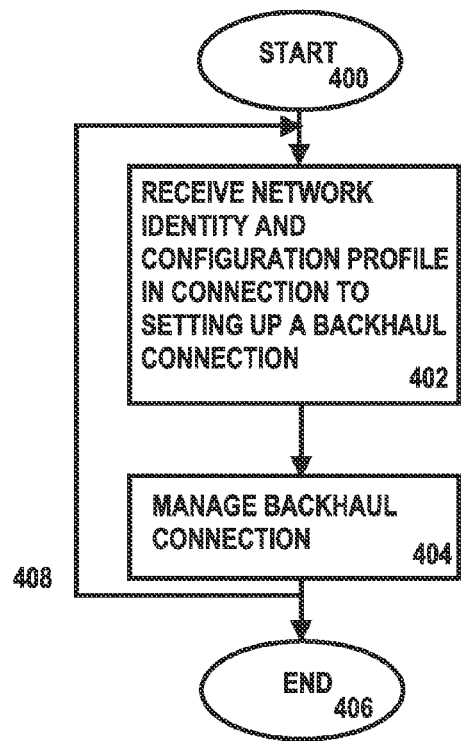

Some embodiments of the present invention are described below, by way of example only, with reference to the accompanying drawings, in which
FIG. 1A illustrates an example of a system;
FIG. 1B illustrates another example of a system;
FIG. 2 illustrates yet another example of a system;
FIG. 3 is a flow chart;
FIG. 4 is another flow chart;
FIG. 5 illustrates examples of an apparatus, and
FIG. 6 illustrates other examples of an apparatus.

DESCRIPTION OF EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments are applicable to any user device, such as a user terminal, relay node, server, node, corresponding component, and/or to any communication system or any combination of different communication systems that support required functionalities. The communication system may be a wireless communication system or a communication system utilizing both fixed networks and wireless networks. The protocols used, the specifications of communication systems, apparatuses, such as servers and user terminals, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on LTE Advanced, LTE-A, that is being specified in 3GPP (third generation partnership project). Currently, LTE-A is based on orthogonal frequency multiplexed access (OFDMA) in a downlink and a single-carrier frequency-division multiple access (SC-FDMA) in an uplink, without restricting the embodiments to such an architecture, however. It is obvious for a person skilled in the art that the embodiments may also be applied to other kinds of communications networks having suitable means by adjusting parameters and procedures appropriately. For example, the embodiments are applicable to both frequency division duplex (FDD) and time division duplex (TDD).

In an orthogonal frequency division multiplexing (OFDM) system, the available spectrum is divided into multiple orthogonal sub-carriers. In OFDM systems, available bandwidth is divided into narrower sub-carriers and data is transmitted in parallel streams. Each OFDM symbol is a linear combination of signals on each of the subcarriers. Further, each OFDM symbol is preceded by a cyclic prefix (CP), which is used to decrease Inter-Symbol Interference. Unlike in OFDM, SC-FDMA subcarriers are not independently modulated.

Typically, a (e)NodeB ("e" stands for advanced evolved) needs to know channel quality of each user device and/or the preferred precoding matrices (and/or other multiple input-multiple output (MIMO) specific feedback information, such as channel quantization) over the allocated sub-bands to schedule transmissions to user devices. Required information is usually signalled to the (e)NodeB.

FIG. 1A is an example of a simplified system architecture only showing some elements and functional entities, all being logical units whose implementation may differ from what is shown. The connections shown in FIG. 1 are logical connections; the actual physical connections may be different. It is apparent to a person skilled in the art that the system typically comprises also other functions and structures than those shown in FIG. 1A.

The embodiments are not, however, restricted to the system given as an example but a person skilled in the art may apply the solution to other communication systems provided with the necessary properties.

FIG. 1A shows a part of a radio access network of E-UTRA, LTE or LTE-Advanced (LTE-A). E-UTRA is an air interface of Release 8 (UTRA=UMTS terrestrial radio access, UMTS=universal mobile telecommunications system). Some advantages obtainable by LTE (or E-UTRA) are a possibility to use plug and play devices, and Frequency Division Duplex (FDD) and Time Division Duplex (TDD) in the same platform.

FIG. 1A shows user devices 100 and 102 configured to be in a wireless connection on one or more communication channels 104, 106 in a cell with a (e)NodeB 108 providing the cell. The physical link from a user device to a (e)NodeB is called uplink or reverse link and the physical link from the NodeB to the user device is called downlink or forward link.

The NodeB, or advanced evolved node B (eNodeB, eNB) in LTE-Advanced, is a computing device configured to control the radio resources of communication system it is coupled to. The (e)NodeB may also be referred to a base station, an access point or any other type of interfacing device including a relay station capable of operating in a wireless environment.

The (e)NodeB includes transceivers, for instance. From the transceivers of the (e)NodeB, a connection is provided to an antenna unit that establishes bi-directional radio links to user devices. The antenna unit may comprise a plurality of antennas or antenna elements. The (e)NodeB is further connected to core network 110 (CN). Depending on the system, the counterpart on the CN side can be a serving system architecture evolution (SAE) gateway (routing and forwarding user data packets), packet data network gateway (PDN GW), for providing connectivity of user devices (UEs) to external packet data networks, or mobile management entity (MME), etc.

A communications system typically comprises more than one (e)NodeB in which case the (e)NodeBs may also be configured to communicate with one another over links, typically radio links, designed for the purpose. These links may be used for signalling purposes.

The communication system is also able to communicate with other networks, such as a public switched telephone network or the Internet 112.

The user device (also called UE, user equipment, user terminal, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, laptop computer, game console, notebook, and multimedia device.

The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

It should be understood that, in FIG. 1A, user devices are depicted to include 2 antennas only for the sake of clarity. The number of reception and/or transmission antennas may naturally vary according to a current implementation. Further, although the apparatuses have been depicted as single entities, different units, processors and/or memory units (not all shown in FIG. 1A) may be implemented.

It is obvious for a person skilled in the art that the depicted system is only an example of a part of a radio access system and in practise, the system may comprise a plurality of (e)NodeBs, the user device may have an access to a plurality of radio cells and the system may comprise also other apparatuses, such as physical layer relay nodes or other network elements, etc. At least one of the NodeBs or eNodeBs may be a Home(e)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e)NodeB 108 of FIG. 1 may provide any kind of these cells. A cellular radio system may be implemented as a multilayer network including several kinds of cells. Typically, in multilayer networks, one node B provides one kind of a cell or cells, and thus a plurality of node Bs are required to provide such a network structure.

The network supporting the concept of Home (e)NodeBs, typically includes a home node B gateway, or HNB-GW. A HNB Gateway (HNB-GW), which is typically installed within an operator's network aggregates traffic from a large number of HNBs back to a core network through Iu-cs and Iu-ps interfaces. A home (e)NodeB (sometimes being comparable to a femto or pico node) when coupled to broadband services providing an umbrella cell provides radio coverage to user devices. H(e)NBs may provide the capabilities of a standard node B or a base station as well as the radio resource management functions of a standard radio network controller (RNC). It may be a relay node as well.

As already stated above, long term evolution (LTE) is an air interface designed to admit higher peak data rates and more users per cell. However, these enhancements in radio link technology do not provide improved functionality at cell borders: coverage and capacity remain relatively small due to low signal-to-interference-plus-noise ratio (SINR). In traditional cellular networks, user devices near a node B typically are served with better capacity than the user devices near cell edge. Additionally, since future development in international mobile telecommunications (IMT) leads to usage of higher frequency bands, already concerning LTE-A, the coverage of one base station (node) may be further limited due to increased propagation loss and limited bit energy.

Thus, as a part of development of LTE-Advanced, as a solution to this cell-edge problem, one or more relay nodes (RNs) may be deployed at a cell edge area thus assisting in increasing capacity or extending cell coverage area. This is expected to increase the equality of users in the network.

Relays are also seen as a cost-effective solution for coverage limited environments. This offers beneficial business perspectives to operators.

FIG. 1B shows an exemplifying system comprising relay node 114. The system is based on the system of FIG. 1A and it is simplified for the sake of clarity. Similar reference numbers in FIGS. 1A and 1B denote similar parts of the system. As shown in FIG. 1B, user devices may have a radio connection to a (e)NodeB via a relay node instead a direct connection. This is shown by arrows 116 and 118.

Two main types of relay nodes exist: a conventional amplify and forward (AF) relays and decode and forward (DF) relays. Since AF relays do not only amplify a desired signal, but also interference and noise, they are best suited to noise limited systems, whereas DF relays, which detect a desired signal and encode and forward it, are well-suited to interference limited and noisy environments, too. DF relays may operate as repeaters, bridges and/or routers. Received data may be error-corrected, automatically repeated (ARQ) stored and scheduled for retransmission, etc.

Relay node systems typically comprise more than one relay nodes. The relay node systems may be divided into single-hop and multi-hop systems. System complexity is related to the number of hops, therefore in practice, most systems are build to use not more than two hops.

A backhaul typically comprises a transport network between cell sites (base stations) and associated controller, gateway sites or base stations. A backhaul connection in turn provides a user with a communication option inside the network, the usage of other networks, such as the Internet, and cloud services as well, etc. Typically, a relay node does not have a wired, but a wireless backhaul connection. Nevertheless, a wired backhaul connection is possible. A wireless backhaul connection is depicted in FIG. 1B by arrow 120. The relay node itself may be fixed or mobile, for example high-speed trains may be equipped with one or more relay nodes. Relay nodes may form a group or cluster, one example of such a group is a cooperative cell group (CCG). A user device may be transferred from one relay node to another within the radio coverage area of the group. This may be carried out by means of a handover procedure. In the group, all the relay nodes may be directly coupled to a base station (node), which differs from the multi-hop case.

Further, although the apparatuses have been depicted as single entities, different units, processors and/or memory units (not all shown in FIG. 1B) may be implemented.

Embodiments are related to a smart coordinated and cooperative relay system with one or more multiple simultaneous donor systems of multiple operators especially suitable for LTE-Advanced (LTE-A) and international telecommunication union (ITU) international mobile telecommunications advanced (IMT-A) standards, wherein flexible deployment of a number of relay nodes is utilized to provide enhanced cellular coverage in large indoor buildings, hot spots at cell edges, passenger trains or cruise ships, for instance. The cooperative relay system may be based on the CCG concept. The donor systems may have common or overlapping service area coverage.

FIG. 2 depicts for illustrative purposes only, exemplifying passenger train 200 operating between two cities in different countries, Paris and Barcelona, for example. The Figure is simplified meaning that, for instance, relay nodes need not be on the roof of the train, but they may be placed in whatever appropriate location.

The train comprises 12 coaches of which 4 are illustrated 202, 204, 206, 208 having a total capacity of 1000 passengers. The passenger capacity of the train is so high that it is most likely that a traditional communication network cannot provide continuous services at a sufficient bit rate to all passengers all the time. Thus cooperative relay system 232 comprising a plurality of relay nodes is deployed to serve passengers on board. The relay system taken as an example is assumed to comprise 12 interconnected relay nodes of which 4 are illustrated 216, 218, 220, 222 that is one per each coach, as shown in FIG. 2. The number of relay nodes per a coach may naturally vary. The passengers on board are mobile users which may be subscribers of different network operators, local as well as global or foreigner. A (e)NodeB of operator A is 228 and a (e)NodeB of operator B is 224. It should be understood that in real systems operators typically have a plurality of nodes. Mobile users on coach 202 are shown as a group 210, mobile users on coach 204 as a group 212, mobile users on coaches 206 and 208 as a group 214. It should be understood that cellular operators may be each other's competitors and thus may not allow roaming for mobile users of other operators at the coverage area as a whole or selected parts of it. The coverage area of operator A is 230 and the coverage area of operator B is 226.

If the cooperative relay system deployed on the train is owned by only one operator, it might be possible that mobile users of other operators may not be allowed to obtain a better wireless access via the relay system due to competition, mobile backhaul capacity provided for the relay system is limited and constrained to the capacity of the donor system of the particular operator (a donor system means a (e)NodeB or a system the (e)NodeB is a part of which may use the relay system) and it may not be able to provide sufficient service with a huge number of mobile users on the train, and/or as the relay system may move out of service coverage of one operator to the service coverage of another one, reconfiguration required by roaming may cause severe service interruption or even system reset affecting ongoing mobile connections and thus deteriorating user experience.

A donor system may comprise a donor node or it may be a combination of a donor node and a mobile management entity gateway (MME/GW) or a corresponding device, in which case the donor node and the mobile management entity gateway are coupled with each other for communication purposes. Some of the operations of a donor node may also be carried out by the mobile management entity gateway completely or partly. Embodiments are in relation to smart coordination and control for providing support of multi-operator multi-donor cooperative relay systems to enable and facilitate improved cooperation.

In the following, some of the embodiments are disclosed in further details in relation to FIGS. 3 and 4.

The embodiment of FIG. 3 is usually related to a relay node.

The embodiment starts in block 300.

In block 302, a network identity of a virtual operational network is received. The virtual operational network has a plurality of donor system candidates and it may be a multi-operator network comprising a group of cooperative relay nodes.

Term "donor system candidates" typically mean donor systems available to a user device. A donor system typically comprises at least a donor node and possibly also mobile management entity gateway (MME/GW). These typically locate in separate units having a possibility to communicate with each other, but they may be located in a same unit as well. The donor system candidates are members of a virtual operational network which is a separated operational network entity and/or service area that is commonly agreed and supported by one or multiple available donor systems of the networks of involved operator(s). The donor systems in this embodiment comprise cooperative relay nodes which may be thought to perform a relay system. The virtual operational network typically appears as a preferable third-party network to mobile users in the system, regardless of their subscribed operators. This makes configuration tasks easier to carry out. The virtual operational network is assigned a network identity which is unique throughout the involved donor cellular systems for entire operation or active time of the virtual operational network. The network may be assigned using an exclusive public land mobile network identity (PLMN ID) or tracking area identity (TA ID) different from that of donor systems, and which may be broadcasted as a part of system information regarding layer 1 cell ID and/or global cell ID, as usual. These IDs may be embedded in the control information in such a manner that both the network side and the user device side may identify the virtual operational network and make decisions based on the ID.

In the train example described above: by allocating a designated exclusive PLMN ID or TA ID to the virtual operational network for the entire trip, mobile users on board may be allowed to select, camp on or get access to the relay system of the virtual operational network system at a high priority and user devices need to perform a location registration and/ or location update only when getting on or off the train, not every time the train travels from a tracking area to another, for instance. This reduces protocol overhead and thus saves in resources on both the network side and on the user side. In this case, the network side, including cooperative relay nodes (RNs) in the relay system, is responsible for keeping track and initiating necessary mobility management of user devices in idle mode instead of mobile users on the train. In block 304, a configuration profile is received. The configuration profile comprises parameters in relation to resource usage in the virtual operational network.

Once the cooperative relay system is set up and operating, reconfigurations which may have disruptive impacts on mobile users of the cooperative relay system should preferably be avoided. Thus, it is beneficial that spectrum resources, at least those regarding a primary carrier, as well as configuration features, such as network identities, and cell-selection control parameters are not reconfigured at all, and if not possible, reconfigured as rarely as possible. According to the train example, the optimum would be that these features are not changed as long as the trip takes.

If advanced flexible spectrum use (FSU) and self organizing or optimizing network (SON) features are utilized in the donor systems, it may be beneficial to apply some kind of negotiation procedure for controlling the usage of spectrum resources of donor systems possibly belonging to different operators. In this case, individual relay nodes and/or cells in the cooperative relay system may be selected and configured with spectrum resources of different operators.

Thus, in an embodiment a configuration profile is used for the cooperative relay system which takes into account at least one of: the demands of agreement between operators on shared spectrum use, travelling routes and/or time schedules, impacts on multi-operator cellular coverage the relays system takes part in, resides in and/or passes, etc. In this regard, the same relay system may be configured with at least partly different configuration profiles for different routes and/or time schedules, for example.

The configuration profile may comprise different parameters such as spectrum allocation of at least a primary carrier, global cell ID, layer 1 cell ID, and cell-selection control parameters for each individual cell in the cooperative relay system. It may also comprise PLMN ID and/or TA ID for identification purposes or to make all the parameters be gathered in a same list.

In block 306, at least one donor system from the donor system candidates is selected.

Individual relay nodes of the cooperative relay node system are allowed to select a preferable donor system among the available candidates. For instance, depending on which one is preferred, an in-band or out-band relay, a relay node may select the donor system which has a most or least overlapping in spectrum allocation. The selection conditions may be applied in the selection of a donor system and in managing the mobile backhaul connection as well, including redirecting or handing over the backhaul connection to another donor system. Hence, a relay system may be seen by a donor system as a coordinated mixture of in-band and out-band relay cells in which relay nodes are interconnected using a cooperative interface referred as crX2 in FIG. 2.

It should be appreciated that different donor systems may have different synchronized timing references. Thus a relay node of the cooperative relay system which may be coupled to different donor systems may exchange timing references and derive appropriate timing offsets to be used in mutual communication and cooperation over the cooperative interface crX2. Additionally, as many neighbouring relay nodes may try to select the same donor system as possible for being able to use the same timing.

In block 308, the network identity and the configuration profile are indicated to the selected at least one donor system in connection of setting up a backhaul connection to the selected at least one donor system.

The configuration profile may be indicated by a relay node of the cooperative relay system upon setting up a mobile wireless backhaul connection. The donor systems involved may communicate with each other on modifications to the configuration profile, and then convey to the cooperative relay system an update via an relay node during operation, but advantageously during a set-up (reactivation) or release (deactivation) the cooperative relay system (or part of it). The backhaul connection may be set up in a typical manner.

A relay node may monitor and keep other relay nodes and/or donor systems updated of available capacity and/or load status on an access link and/or backhaul link. Different load-based thresholds may be introduced, configured and updated to the relay nodes for decision-making regarding triggering and performing network functions, such as measuring and reporting, radio resource controlling including admission control, redirecting or carrying out a handover of user devices using the backhaul connection in question.

The relay node may assist its donor system in admission control on the backhaul connection when receiving a connection request from a user device. The relay node may admit and provide an access link with the user device in its cell and then redirect the connection request to another relay node over the crX2 interface and also request for setting up a backhaul connection to the user device, in the case no sufficient resources over its own backhaul connection are provided or if the user is a subscriber of another donor system also providing a mobile wireless backhaul connection to the same relay system. Hence, one mobile device may have a connection to more than one relay node simultaneously. It is also possible that the user device may keep these simultaneous connections for a longer period of time than only during the connection transfer. A relay node involved in providing a current backhaul connection to a user device may initiate a handover of the connection.

The embodiment ends in block 310. The embodiment is repeatable in many ways. One example is shown by arrow 312 in FIG. 3.

The embodiment of FIG. 4 is usually related to a donor node of a donor system. The donor system may also comprise a mobile management entity gateway (MME/GW), in which case the donor node and the mobile management entity gateway are coupled with each other for communication purposes. Some of the operations of a donor node may also be carried out completely or partly by the mobile management entity gateway.

The embodiment starts in block 400.

In block 402, a network identity of a virtual operational network and a configuration profile are received, in connection to setting up a backhaul connection, from a relay node of the virtual operational network. The configuration profile comprises parameters in relation to resource usage in the virtual operational network. The virtual operational network comprises a plurality of relay nodes and it may be a multi-operator network comprising a group of cooperative relay nodes.

The virtual operational network is assigned a network identity which is unique throughout the involved donor cellular systems for entire operation or active time of the virtual operational network. The network may be assigned using an exclusive public land mobile network identity (PLMN ID) or tracking area identity (TA ID) different from that of donor systems, and which may be broadcasted as a part of system information regarding layer 1 cell ID and/or global cell ID, as usual. These IDs may be embedded in the control information in such a manner that both the network side and the user device side may identify the virtual operational network and make decisions based on the ID.

In an embodiment a configuration profile is used for the cooperative relay system which takes into account at least one of: the demands of agreement between operators on shared spectrum use, travelling routes and/or time schedules, impacts on multi-operator cellular coverage the relays system takes part in, resides in and/or passes, etc. In this regard, the same relay system may be configured with at least partly different configuration profiles for different routes and/or time schedules, for example. The relay system comprises cooperative relay nodes.

The configuration profile may comprise different parameters such as PLMN ID, TA ID, spectrum allocation of at least a primary carrier, global cell ID, layer 1 cell ID, and cell-selection control parameters for each individual cell in the cooperative relay system.

The configuration profile may be indicated by a relay node of the cooperative relay system upon setting up a mobile wireless backhaul connection. The backhaul connection may be set up in a typical manner.

Further details on the identity of the virtual operational network, the configuration profile and the backhaul connection are disclosed in relation to FIG. 3.

In block 404, the backhaul connection is managed during operation.

The backhaul connection may be managed in a typical manner, including admission control, etc. Addition to that the managing may comprise additional tasks or new procedures, such as: first, donor systems may communicate and agree with each other on modifications to the configuration profile, and then convey to a cooperative relay system an update via a relay node during operation (that is typically carried out by transmitting the update to one or more of the relay nodes of the system using the backhaul connection), but advantageously during a set-up (reactivation) or release (deactivation) the cooperative relay system (or part of it). Second, the donor system may be assisted in the admission control on the backhaul connection when receiving a connection request from a user device. The relay node may redirect a user device's connection request to another relay node and also request for setting up a backhaul connection to the user device, in the case no sufficient resources over its own backhaul connection are provided or if the user is a subscriber of another donor system also providing a mobile wireless backhaul connection to the same relay system. Third, the backhaul connection may be handed over from one donor system to another one for backhaul connection optimization purposes based on load balancing and capacity sharing. The user device may also keep more than one backhaul connections. In the handover case, the current donor system may initiate and perform the handover of the backhaul connection with the target donor system via appropriate relay nodes.

The embodiment ends in block 406. Also this embodiment is repeatable. Arrow 408 shows one repetition example.

The steps/points, signaling messages and related functions described above in FIGS. 3 and 4 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point.

It should be understood that transmitting and/or receiving may herein mean preparing a transmission and/or reception, preparing a message to be transmitted and/or received, or physical transmission and/or reception itself, etc on a case by case basis.

Embodiment provide apparatuses which may be any node, host, user device, network stick or any other suitable apparatus able to carry out processes described above in relation to FIGS. 3 and 4.

FIG. 5 illustrates a simplified block diagram of an apparatus according to an embodiment especially suitable for operating as a relay node. An embodiment of a method which may be carried out in a relay node is described above in relation to FIG. 3.

As an example of an apparatus according to an embodiment, it is shown an apparatus (500), such as a node device, including facilities in a control unit (504) (including one or more processors, for example) to carry out functions of embodiments, such as selecting a donor system or donor node. This is depicted in FIG. 5.

Another example of an apparatus (500) may include at least one processor 504 and at least one memory 502 including a computer program code, the at least one memory and the computer program code configured to, with the at least one processor, cause the apparatus at least to: receive a network identity of a virtual operational network, the virtual operational network having a plurality of donor node candidates, receive a configuration profile, the configuration profile comprising parameters in relation to resource usage in the virtual operational network, select at least one donor node from the donor system candidates, and indicate the network identity and the configuration profile to the selected at least one donor system in connection to setting up a backhaul connection to the selected at least one donor system. Yet another example of an apparatus comprises means (504, 506) for receiving a network identity of a virtual operational network, the virtual operational network having a plurality of donor node candidates, means (504, 506) for receiving a configuration profile, the configuration profile comprising parameters in relation to resource usage in the virtual operational network, means (502, 504) for selecting at least one donor node from the donor system candidates, and means (504, 506) for indicating the network identity and the configuration profile to the selected at least one donor system in connection to setting up a backhaul connection to the selected at least one donor system.

Yet another example of an apparatus comprises a first receiving unit (504, 506 or their combination) configured to receive a network identity of a virtual operational network, the virtual operational network having a plurality of donor node candidates, a second receiving unit (506, 504 or their combination) configured to receive a configuration profile, the configuration profile comprising parameters in relation to resource usage in the virtual operational network, a selector (504) configured to select at least one donor node from the donor system candidates, and an indicator (504, 506 or their combination) configured to indicate the network identity and the configuration profile to the selected at least one donor system in connection to setting up a backhaul connection to the selected at least one donor system.

It should be understood that a first receiving unit and a second receiving unit may be combined as one unit as in the Figure, or they be separate units.

FIG. 6 illustrates a simplified block diagram of an apparatus according to an embodiment especially suitable for operating as a donor system or donor node. An embodiment of a method which may be carried out in a donor system or donor node is described above in relation to FIG. 3.

As an example of an apparatus according to an embodiment, it is shown an apparatus (600), such as a node device, including facilities in a control unit (604) (including one or more processors, for example) to carry out functions of embodiments, such as setting up and managing a backhaul connection. This is depicted in FIG. 6.

Another example of an apparatus (600) may include at least one processor 604 and at least one memory 602 including a computer program code, the at least one memory and the computer program code configured to, with the at least one processor, cause the apparatus at least to: receive, in connection to setting up a backhaul connection, a network identity of a virtual operational network and a configuration profile from a relay node of the virtual operational network, the configuration profile comprising parameters in relation to resource usage in the virtual operational network, the virtual operational network comprising a plurality of relay nodes, and manage the backhaul connection during operation. Yet another example of an apparatus comprises means (604, 606 or their combination) for receiving, in connection to setting up a backhaul connection, a network identity of a virtual operational network and a configuration profile from a relay node of the virtual operational network, the configuration profile comprising parameters in relation to resource usage in the virtual operational network, the virtual operational network comprising a plurality of relay nodes, and means (604, 606 or their combination, also memory 602 may be involved) for managing the backhaul connection during operation.

Yet another example of an apparatus comprises a receiving unit (604, 606 or their combination) configured to receive, in connection to setting up a backhaul connection, a network identity of a virtual operational network and a configuration profile from a relay node of the virtual operational network, the configuration profile comprising parameters in relation to resource usage in the virtual operational network, the virtual operational network comprising a plurality of relay nodes, and a managing unit (604, 606 or their combination, also memory 602 may be involved) configured to manage the backhaul connection during operation.

It should be appreciated that different units may be implemented as one module, unit, processor, etc, or as a combination of several modules, units, processor, etc.

It should be understood that the apparatuses may include other units or modules etc. used in or for transmission. However, they are irrelevant to the embodiments and therefore they need not to be discussed in more detail herein. Transmitting may herein mean transmitting via antennas to a radio path, carrying out preparations for physical transmissions or transmission control, etc. depending on the implementation. Receiving may herein mean receiving via antennas from a radio path, carrying out preparations for physical receptions or reception control depending on the implementation, etc. The apparatus may utilize a transmitter and/or receiver which are not included in the apparatus itself, such as a processor, but are available to it, being operably coupled to the apparatus. This is depicted in FIG. 5 as transceiver 506 and correspondingly in FIG. 6 as transceiver 606.

It should be appreciated that the apparatuses may also include other units or parts than those depicted in FIG. 5 or 6. Although the apparatuses have been depicted as one entity, different modules and memory may be implemented in one or more physical or logical entities.

The apparatus may in general include at least one processor, controller or a unit designed for carrying out control functions operably coupled to at least one memory unit and to various interfaces. Further, the memory units may include volatile and/or non-volatile memory. The memory unit may store computer program code and/or operating systems, information, data, content or the like for the processor to perform operations according to embodiments. Each of the memory units may be a random access memory, hard drive, etc. The memory units may be at least partly removable and/or detachably operationally coupled to the apparatus. The memory may be of any type suitable for the current technical environment and it may be implemented using any suitable data storage technology, such as semiconductor-based technology, flash memory, magnetic and/or optical memory devices. The memory may be fixed or removable.

The apparatus may be a software application, or a module, or a unit configured as arithmetic operation, or as a program (including an added or updated software routine), executed by an operation processor. Programs, also called program products or computer programs, including software routines, applets and macros, can be stored in any apparatus-readable data storage medium and they include program instructions to perform particular tasks. Computer programs may be coded by a programming language, which may be a high-level programming language, such as objective-C, C, C++, Java, etc., or a low-level programming language, such as a machine language, or an assembler.

Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a node device, or a corresponding component, may be configured as a computer or a microprocessor, such as single-chip computer element, or as a chipset, including at least a memory for providing storage capacity used for arithmetic operation and an operation processor for executing the arithmetic operation.

Embodiments provide computer programs embodied on a distribution medium, comprising program instructions which, when loaded into electronic apparatuses, constitute the apparatuses as explained above.

Other embodiments provide computer programs embodied on a computer readable medium, configured to control a processor to perform embodiments of the methods described above.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g., procedures, functions, and so on) that perform the functions described herein. The software codes may be stored in a memory unit and executed by processors. The memory unit may be implemented within the processor or externally to the processor. In the latter case it can be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

The invention claimed is:

1. An apparatus comprising:
at least one processor and at least one memory including a computer program code, the at least one memory and the computer program code configured, with the at least one processor, to cause the apparatus at least to:
receive a network identity of a virtual operational network, the virtual operational network having a plurality of donor system candidates, said virtual operational network being a separated operational network entity and/or service area commonly agreed and supported by one or multiple available donor systems, and said network identity being unique throughout the involved donor systems for the entire operation or active time of the virtual operational network;
receive a configuration profile, the configuration profile comprising parameters in relation to resource usage in the virtual operational network;
select at least one donor node from the donor system candidates; and
indicate the network identity and the configuration profile to the selected at least one donor node in connection with setting up a backhaul connection to the selected at least one donor node; and
monitor and keep other relay nodes of a group of cooperative relay nodes and/or donor systems updated of available capacity and/or load status on an access link and/or backhaul link,
wherein the apparatus comprises a relay node belonging to the group of cooperative relay nodes, wherein the group of cooperative relay nodes is within the virtual operational network, and wherein the virtual operational network is a multi-operator network.

2. The apparatus of claim 1, wherein the configuration profile comprises at least one of the following parameters: spectrum allocation of at least a primary carrier, global cell identification, layer 1 cell identification, and cell-selection control parameters.

3. A computer program product embodied on a non-transitory computer readable medium, the computer program being configured to control a processor to perform:
receiving a network identity of a virtual operational network, the virtual operational network having a plurality of donor system candidates, said virtual operational network being a separated operational network entity and/or service area commonly agreed and supported by one or multiple available donor systems, and said network identity being unique throughout the involved donor systems for the entire operation or active time of the virtual operational network;
receiving a configuration profile, the configuration profile comprising parameters in relation to resource usage in the virtual operational network;
selecting at least one donor node from the donor system candidates;
indicating the network identity and the configuration profile to the selected at least one donor node in connection with setting up a backhaul connection to the selected at least one donor node; and
monitoring and keeping other relay nodes of a group of cooperative relay nodes and/or donor systems updated of available capacity and/or load status on an access link and/or backhaul link,
wherein the processor is in a relay node belonging to the group of cooperative relay nodes, wherein the group of cooperative relay nodes is within the virtual operational network, and wherein the virtual operational network is a multi-operator network.

4. A method comprising:
receiving a network identity of a virtual operational network, the virtual operational network having a plurality of donor system candidates, said virtual operational network being a separated operational network entity and/or service area commonly agreed and supported by one or multiple available donor systems, and said network identity being unique throughout the involved donor systems for the entire operation or active time of the virtual operational network;
receiving a configuration profile, the configuration profile comprising parameters in relation to resource usage in the virtual operational network;
selecting at least one donor node from the donor system candidates;

indicating the network identity and the configuration profile to the selected at least one donor node in connection with setting up a backhaul connection to the selected at least one donor node; and monitoring and carrying out updating of available capacity and/or load status on an access link and/or backhaul link, wherein the virtual operational network is a multi-operator network comprising a group of cooperative relay nodes.

5. The method of claim 4, wherein the configuration profile comprises at least one of the following parameters: spectrum allocation of at least a primary carrier, global cell identification, layer 1 cell identification, and cell-selection control parameters.

* * * * *